United States Patent [19]
Hoffman

[11] Patent Number: 5,851,563
[45] Date of Patent: Dec. 22, 1998

[54] RECONFIGURE MODULAR TOOLING

[75] Inventor: Peter L. Hoffman, Florissant, Mo.

[73] Assignee: McDonnell Douglas Corporation, St. Louis, Mo.

[21] Appl. No.: 829,503

[22] Filed: Mar. 28, 1997

[51] Int. Cl.⁶ .......................... B29C 33/00; B28B 07/02
[52] U.S. Cl. .................... 425/175; 249/155; 425/182; 425/DIG. 44
[58] Field of Search .................. 249/155; 425/175, 425/394, 182, 395, 406, 408, DIG. 44

[56] References Cited

U.S. PATENT DOCUMENTS

| | | | |
|---|---|---|---|
| 4,200,272 | 4/1980 | Godding | 269/26 |
| 4,684,113 | 8/1987 | Douglas et al. | 269/266 |
| 5,151,277 | 9/1992 | Bernardon et al. | 249/155 |
| 5,168,635 | 12/1992 | Hoffman | 33/561.1 |
| 5,192,560 | 3/1993 | Umetsu et al. | 425/175 |
| 5,330,343 | 7/1994 | Bertreau | 425/175 |
| 5,470,590 | 11/1995 | Brubaker et al. | 249/155 |
| 5,513,972 | 5/1996 | Schroeder et al. | 249/155 |
| 5,546,313 | 8/1996 | Masters | 425/175 |

FOREIGN PATENT DOCUMENTS 1425312  2/1976  United Kingdom ................... 249/155

*Primary Examiner*—Robert Davis
*Attorney, Agent, or Firm*—Peoples, L.L.C.; Veo Peoples, Jr.; Ben Hudson

[57] ABSTRACT

A reconfigurable modular tooling system is provided that approximates the contour of a workpiece to be formed by adjusting the height of an array of pins, each of which represents the contour of the workpiece at that point. A flexible sheet is supported by the pins such that movement of the pins into their contoured position adjusts the flexible sheet forming a mold for a composite part to be manufactured. The modular tooling unit is comprised of a hard rubber which functions to lock the array of pins in position. The locking function of the pins is obtained when the pins are rotated in apertures that match the shape of the pins within the hard rubber tooling unit which distorts the shape of the apertures and locks the pin in position.

7 Claims, 6 Drawing Sheets

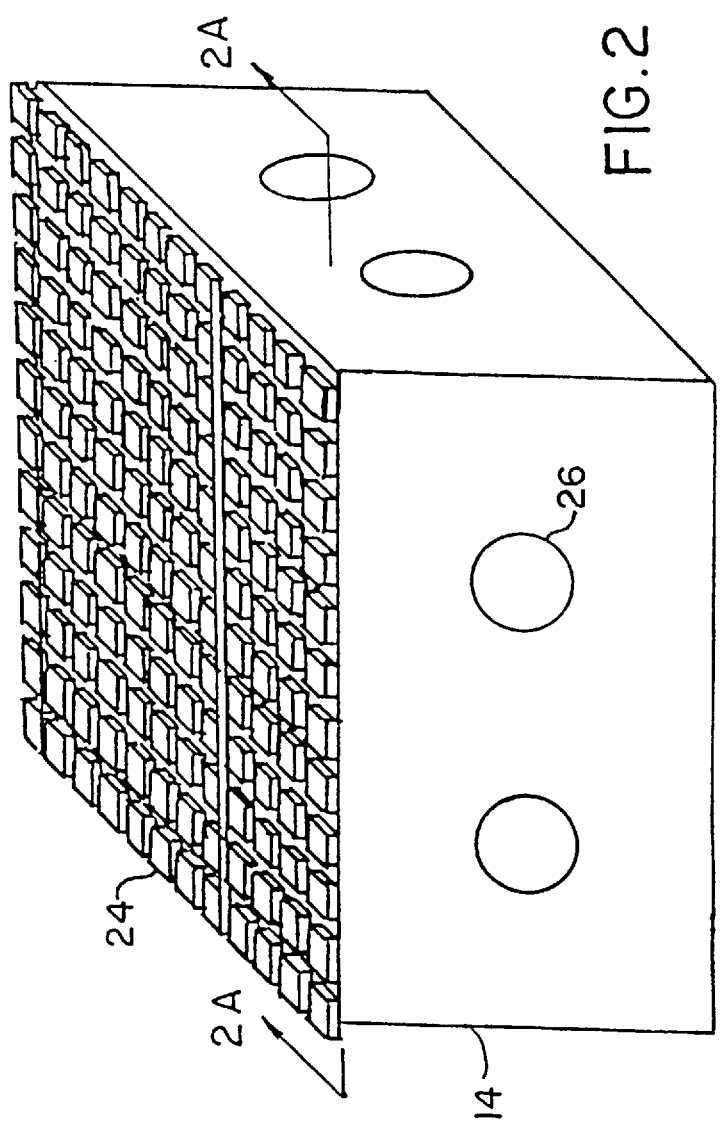

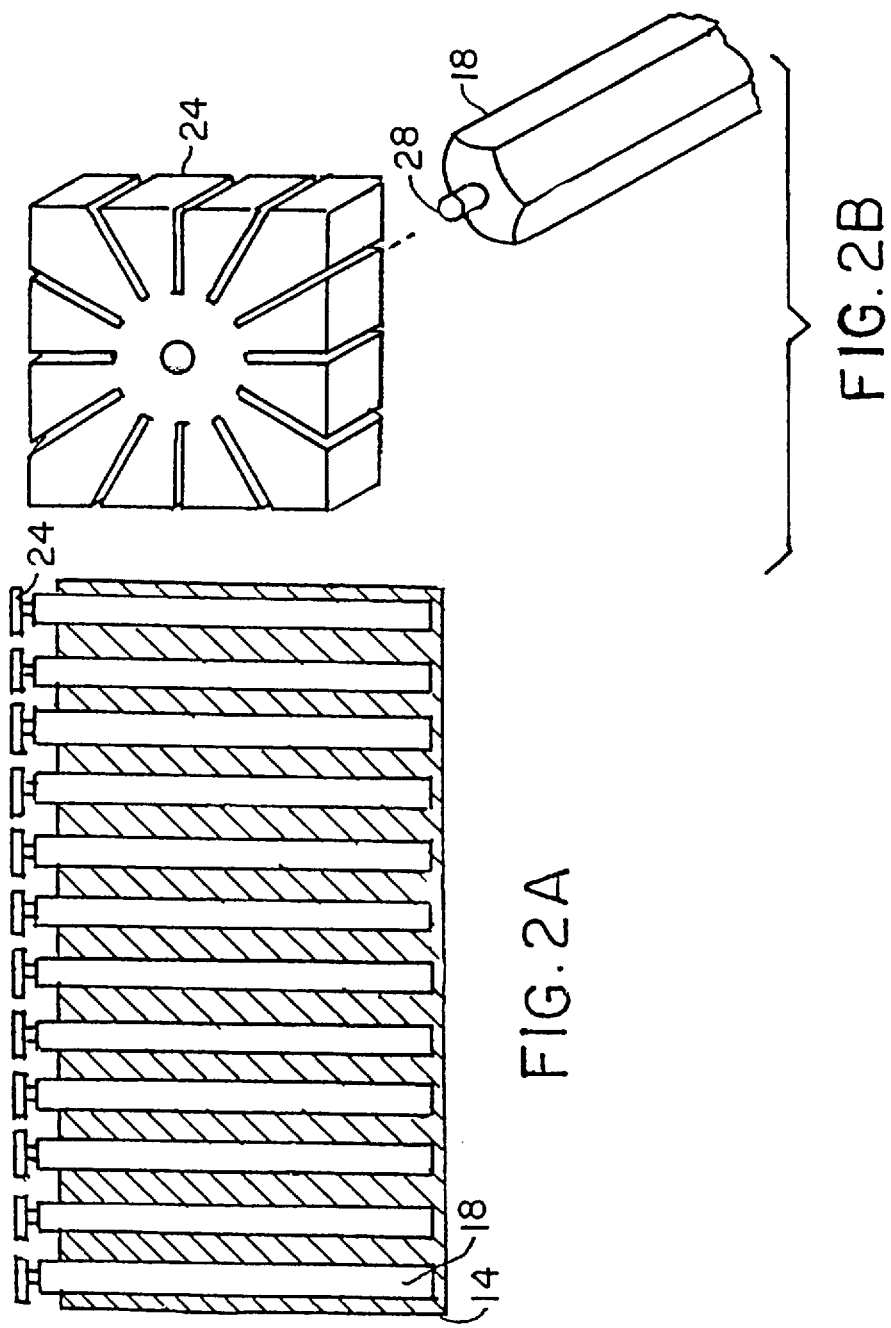

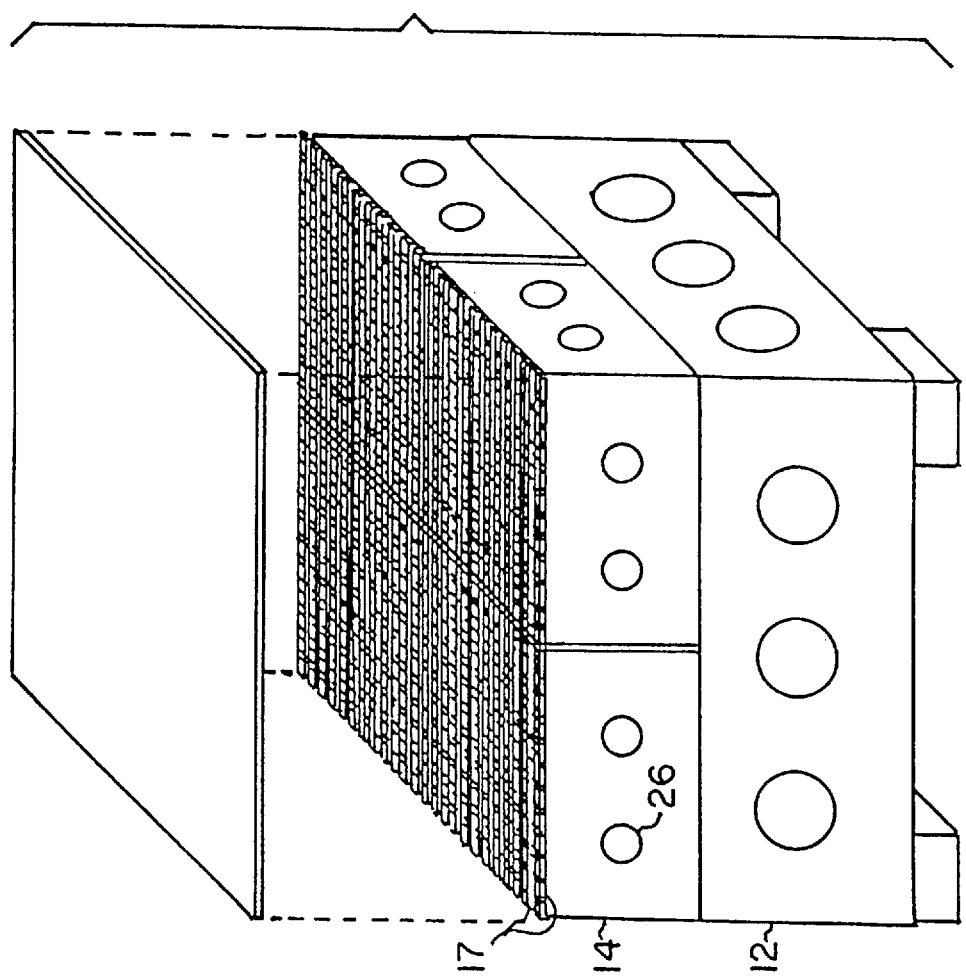

RECONFIGURE MODULAR TOOLING

BACKGROUND OF INVENTION

1. Field of Invention

This invention relates generally to tooling for positioning and forming workpieces, and, more particularly, tooling that can form a workpiece into a particular shape and then be reconfigured to adapt to a workpiece of a different shape, providing tooling which can be reconfigured for infinite numbers of shapes.

2. Brief Description of Prior Art

It is well known to those skilled in the art to provide apparatus that is disposed to automatically conform to the contour of a curved surface or workpiece. These apparatuses use spaced arrays of adjustable rods or spindles mounted in a two-dimensional array that can be moved upwards individually and locked in position to approximate the contour of a workpiece. Such apparatuses are shown in U.S. Pat. No. 4,200,272, entitled "Holder for Irregular Shaped Articles", U.S. Pat. No. 4,088,312, entitled "Variable Contour Securing System", and U.S. Pat. No. 4,684,113, entitled "Universal Holding Fixture". These patents disclose apparatuses that all have certain common features, the first being that the fixtures generally comprise an array of engaging rods which are individually adjusted in height so that they approximate the contour of a workpiece. These rods which engage the workpiece are locked in place by some type of locking mechanisms and a holding force, usually a suction cup, is used to firmly engage the workpiece to the fixture.

The apparatus disclosed in these patents are generally designed to support and hold a workpiece in a fixed position to provide for further machining or manufacturing.

Disclosed in U.S. Pat. No. 5,168,635, entitled "Conformable Tool", assigned to the assignee of the instant application, is an apparatuses having an array of pins that are locked in place to conform to a workpiece contour so that the tool can be used as a forming base to reproduce the workpiece surface. This apparatus is distinguished from the patents previously cited because it is designed to form a mold or base for reproducing a workpiece surface as opposed to locking a workpiece in position for further manufacturing.

OBJECTS OF THE INVENTION

It is an object of this invention to provide an improved apparatus and method for approximating a workpiece contour.

It is a further object of this invention to provide an improved apparatus and method for a conformable tool that can approximate an infinite number of workpiece contours forming a base or mold for producing a workpiece having a surface matching the contour of the mold.

It is still a further object of this invention to provide an apparatus and method for a conformable tool that is generally comprised of modular building blocks that can be added or removed from the apparatus so that the tool can conform to workpieces having different sizes as well as shapes.

SUMMARY OF THE INVENTION

There is provided by this invention a reconfigurable tooling module and method for the use thereof that has a base drive unit disposed to provide motions along three independent and orthogonal axes: x, y, and z. Mounted on the base unit are modular tooling blocks that are locked together to form a single tooling unit, each having apertures for supporting an array of pins that are individually adjusted by the drive unit to approximate the shapes of various workpieces. Each tooling module is generally comprised of a rubber block having an array of hexagonal apertures cut therein. Each aperture has an hexagonal-shaped pin disposed to be slideably mounted within the module. The module is mounted upon the drive base unit such that the drive base unit can adjust the height of each pin individually and rotate the pin, which distorts the shape of the aperture and locks the pin in position. A flexible surface is connected to the ends of the pin that forms the contour of a workpiece mold.

BRIEF DESCRIPTION OF THE DRAWINGS

FIG. 2 illustrates a perspective view of a reconfigurable tooling module.

FIG. 2A is a side view of the reconfigurable tooling module shown in FIG. 2.

FIG. 2B is a top view of a slidable pin shown in FIG. 2.

FIG. 4 illustrates a tooling rack supporting individual tooling modules.

BRIEF DESCRIPTION OF THE PREFERRED EMBODIMENT

Figure 1:
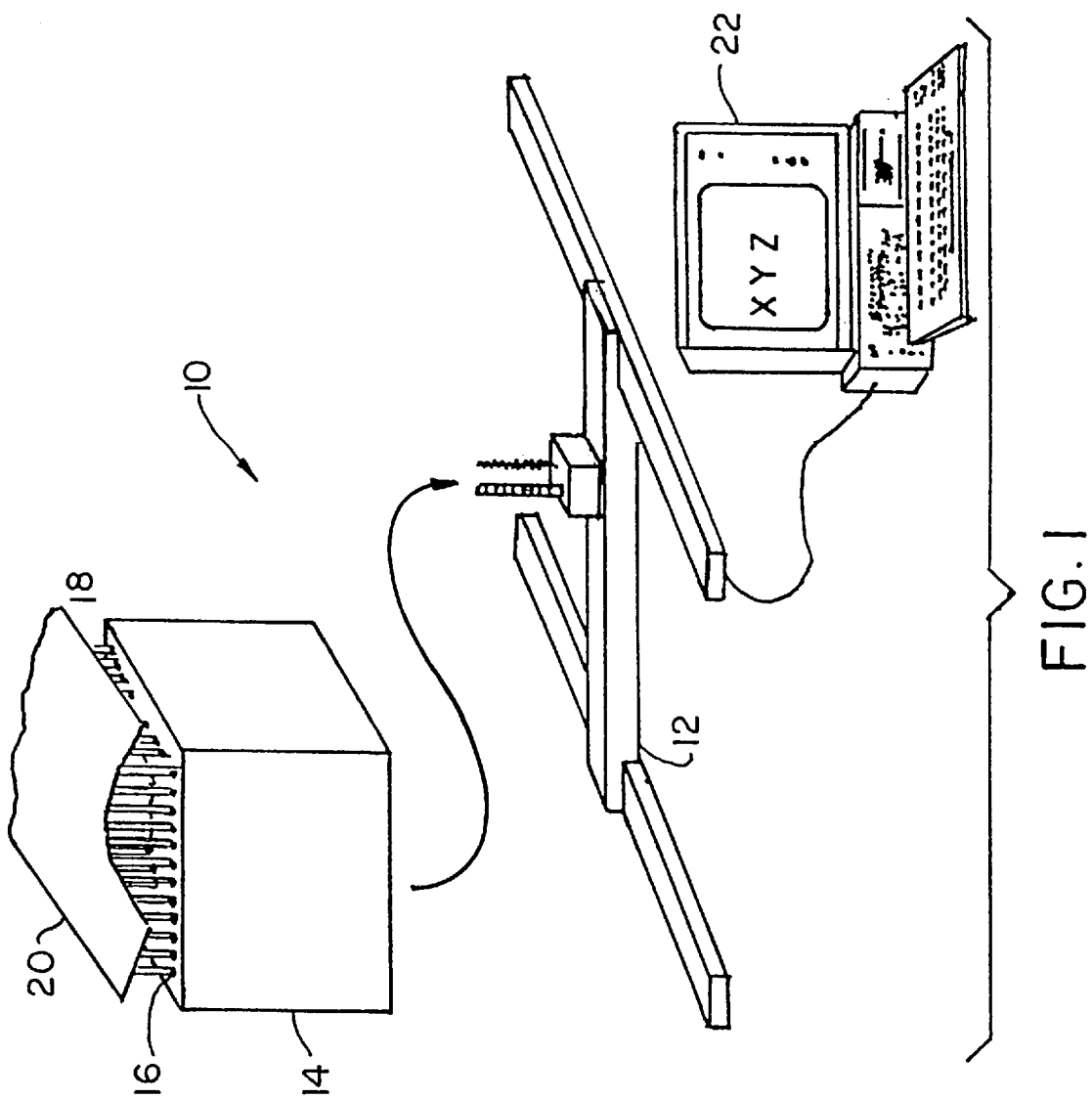
FIG. 1 illustrates a modular reconfigurable tooling system incorporating the principles of this invention.

Referring to FIG. 1, there is shown a modular reconfigurable tooling system 10 incorporating the principles of this invention. The system is basically comprised of a base drive servomechanism 12 that provides independent motions along the x, y and z directions. Mounted upon the base drive servo unit 12 is a modular tooling unit 14 which is generally a block of RTV rubber having an array of hexagonal apertures cut therein. The apertures 16 are approximately 1-inch apart from each other in the array. Slideably mounted in each aperture is a hexagonal pin 18. The modular tooling unit 14 is approximately 1-foot by 1-foot in size. Although only one modular unit is shown, an array of modular units may be connected together to form the complete system. For instance, a 4×4 system may consist of four of the 1×1 modular tooling units. This modular design allows the system to be reconfigured to adapt to the size of the workpiece. The hexagonal pin 18 are disposed to be moved vertically by the base drive unit 12 to a position that matches the contour of a flexible workpiece mold or workpiece 20. The item 20 may either be a workpiece that is held in position for further machining or a flexible workpiece mold that is shaped by the pins to form a mold that can be used to reproduce a workpiece having a contour that matches the mold 20. Each of the pins are moved vertically to a height that matches the contour of the workpiece mold 20 and locked in position in a manner hereinafter described. The drive unit 12 is controlled by a PC or other computer means 22 through an interface, not shown but well known to those skilled in the art, which has stored therein software and other algorithms that can approximate the shape and contour of various work surfaces. Attached to the ends of the hexagonal pins are flexible supports 24 which may either attach to the workpiece 20 and hold it in position, or adjust the flexible workpiece mold 20 to a position or contour determined by the computer to form a mold.

FIG. 2 is a perspective view of a reconfigurable tooling module 14. Connect points, such as 26, are provided so that modules may be connected to or aligned to each other. Atop each pin 18 is a flexible tooling support 24 by which a flexible coupling is made with the workpiece 20. FIG. 2A is a sectional view taken along the line 2A—2A of FIG. 2 which shows the pin mounted in the reconfigurable tooling module having the flexible tooling support 24 mounted thereon. A pin and ball bearing 28 supports the flexible tooling support 24 so it can pivot universally. Flexible tooling surfaces 24 are generally comprised of a spring support head as shown in FIG. 2B that gives the head constant stiffness across its surface. The head is encased in rubber for flexibility.

Figure 3A:
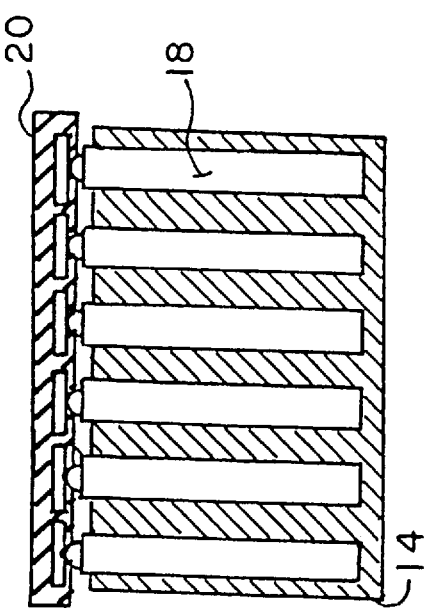
FIG. 3A is a side view of the reconfigurable tooling module shown in FIG. 2 in its initial position.
Figure 3B:
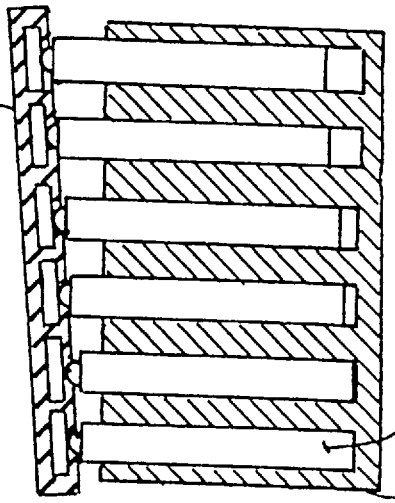
FIG. 3B is a side view of the reconfigurable tooling module shown in FIG. 2 in a contoured position.

As shown in FIGS. 3a and 3b, as the different pins are moved into positions at different heights as defined by the digital surface design from the computer station 22, flexible heads change position and shape to conform to the position of the surface generated by the computer 22. In FIG. 3A the pins 18 are in their initial position prior to actuation of the base drive servomechanism 12. Upon starting the generation of the surface contour, the pins 18 are each moved by the drive unit vertically to a position corresponding to the surface contour at that point.

FIG. 4 illustrates an array of tooling modules mounted on a drive base unit 12 supporting a one-piece RTV rubber face sheet that serves as the flexible workpiece mold 20 that provides a smooth tooling surface. Four tooling modules 14 are mounted on the drive unit 12 to form a 4×4 tooling surface. The rows and columns of apertures supporting the pins 18 are separated by metallic strips such as 17 that serve to isolate each aperture independently.

Figure 5:
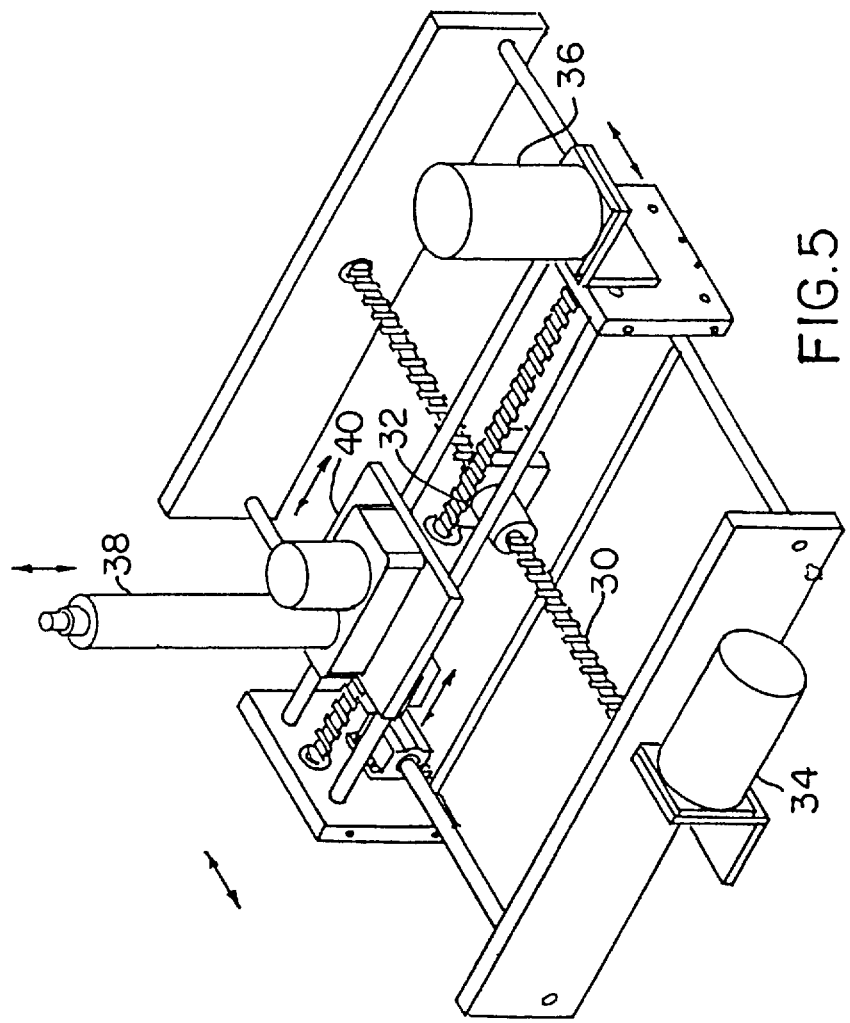
FIG. 5 is an isometric view of the drive unit.

FIG. 5 generally shows the base unit having a drive assembly incorporated therein. The base unit is designed to provide motions along the orthogonal axes x, y, and z. The motion of the device along the x and y axes are accomplished by two ball screw arrangements 30 and 32 driven by two powerful high performance stepper motors 34 and 36 such as supplied by New Logics, Inc. Each stepper motor has an integrated encoder used for accurate positioning and servoing the motor. The third independent axis includes a linear actuator 38 powered by a stepper motor 40. The linear actuator 38 may be the type supplied by Ultramotion, Incorporated, and is able to provide up to 500 lbs. of force. This linear actuator provides a pure translational motion without any rotational motion along the z-axis. The linear actuator is equipped with a high resolution potentiometer providing analog signals and positive feedback to the computer 22. Each pin 18 has a maximum of 3 inches travel along the z-axis. Besides providing the three independent motions along the x, y, and z directions, the basic driving unit provides a 30° rotation about its z-axis of translation, reaches each pin individually and unlocks it by rotating it 30° in its current position. It vertically adjusts the pin to any desired height, and then locks the pin in that position by rotating it 30°. The locking function is accomplished because the modular tooling units are comprised of a hard rubber; when the hexagonal pins are positioned in the hexagonal apertures, the shafts easily and slideably move within the apertures, but upon rotation of the pin within the aperture, the pin configuration is out of alignment with the configuration of the aperture which distorts the aperture and forces the pin in a natural locking position. The metallic strips 17 prevent the distortion of any one aperture from affecting another.

Figure 6:
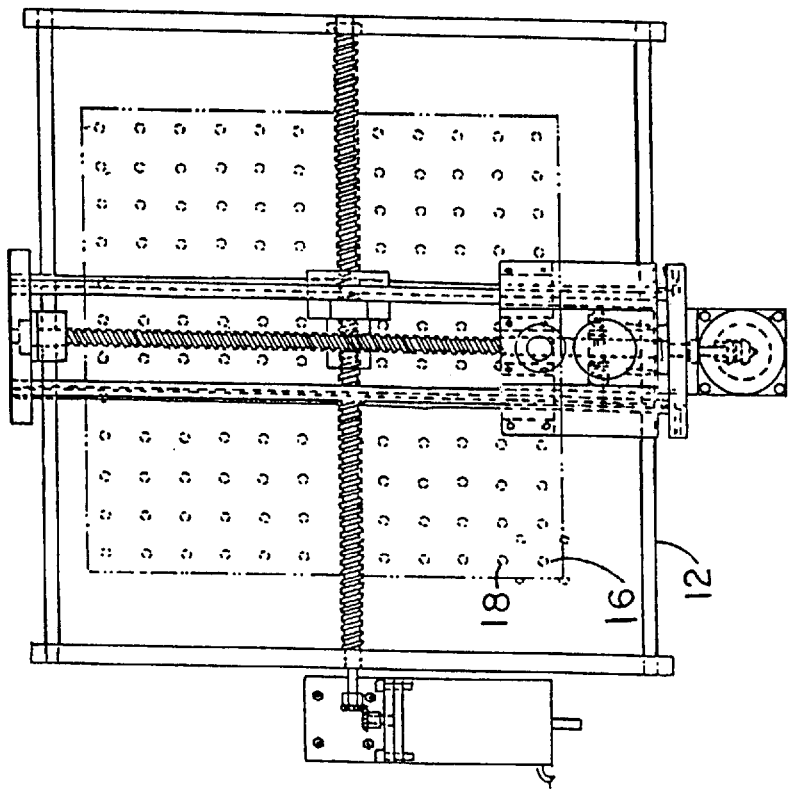
FIG. 6 is a plan view of the reconfigurable tooling apparatus.

FIG. 6 shows a plan view of the modular tooling assembly, illustrating the drive unit 12 and the apertures 16 and pins 18. The drive unit moves to each pin and adjusts its height based upon the contour design generated by the computer 22. Referring again to FIGS. 1 through 4, in the case where the computer generates the contour of a workpiece to be manufactured, the drive unit individually moves the pins to adjust the contour of the flexible workpiece 20 to conform to the design generated by the computer forming a mold for reproduction of a part conforming to the contour of the flexible workpiece 20. In this case the flexible workpiece mold 20 is now ready and adaptable to be used as a forming device for producing a part such as a composite part that is used in the aircraft or automotive industries. Once the mold has been formed by the modular tooling apparatus, tooling modules 14 can be removed from the drive base 12. The tooling modules then are sent to other manufacturing areas or process areas where the tooling modules are actually used as a mold for curing and forming parts and other apparatuses, such as composite parts for aircraft. In this instance, new modules may be placed on the drive unit 12 and the process is initiated again for a workpiece having a different size and contour while the previous modules are going through further processing and manufacturing. Thus, the tooling modules 14 are tooling fixtures that can be placed in enclaves or other molding equipment in which composite parts or other parts may be manufactured without subjecting the electronics and the drive units 12 to the process environments during further manufacturing.

In using this equipment to generate composite parts such as those normally used in the aircraft industry and the automotive industry, the modular tooling system as described may be used as follows. First, the operator would generate a surface design using an Autocad package which may be supplemented with a database containing a 2-D or 3-D graphics library used for regeneration of curved surfaces. Logical checking is performed by the system software to assure that the modular reconfigurable tooling system has the ability to meet the geometry requirements of the surface design. The computer then instructs the drive unit 12 to adjust the pins 18 to individual heights to approximate the contour of the surface design generated by the computer. On-line feedback systems may be provided (not shown, but well known to those skilled in the art) that feeds back to the computer the actual positioning of each pin 18 so that the curvature of the surface to be generated is closely approximated. Once the tooling modules have been reconfigured by the drive unit 12 to form a mold for generating a part, the tooling modules may be removed from the control unit base 12 for further processing.

Although there has been illustrated specific structure and mode of operation, it is clearly understood that the same were merely for purposes of illustration and that changes and modifications may be readily made by those skilled in the art without departing from the spirit and scope of this invention.

What is claimed:

1. An apparatus for forming a mold for a workpiece having a contoured surface, comprising:
   a. a base including a drive mechanism having at least four axes of motion;
   b. tooling module means for conforming to the contour of a curved pre-programmed surface or workpiece, mounted on the base and having a spaced array of apertures therein with pins slideably movable within the apertures, wherein the tooling module means generally consists of rubber blocks connected into an array of tooling blocks to form a single tooling fixture; and c. computer means for storing algorithms to approximate the shape and contour of various workpieces and having interface means to control the drive mechanism in at least four axes of motion, to position the pins to approximate the contour of a workpiece.

2. An apparatus for forming a mold for a workpiece having a contoured surface as recited in claim 1 wherein the apertures and pins have generally a hexagonal shape.

3. An apparatus for forming a mold for a workpiece having a contoured surface as recited in claim 2 wherein the drive means moves in an x-y plane to the position of each pin and drives the pin vertically in the z plane to a position that approximates the contour of a workpiece at that point.

4. An apparatus for forming a mold for a workpiece having a contoured surface as recited in claim 3 wherein the drive means rotates the hexagonal pin within the aperture forcing the pin to distort the aperture and lock the pin into that position.

5. An apparatus for forming a mold for a workpiece having a contoured surface as recited in claim 4 wherein the array of apertures has a metallic strip between every row and column isolating each aperture from the other.

6. An apparatus for forming a mold for a workpiece having a contoured surface as recited in claim 5 wherein each pin has mounted thereon a flexible tooling support disposed to rotate universally, comprised of a spring support head with constant stiffness across its surface.

7. An apparatus for forming a mold for a workpiece having a contoured surface as recited in claim 6 wherein the array of pins is covered with a flexible tooling surface disposed to be formed into a contour by the array of pins producing a mold matching the contour of a workpiece generated by the computer means.

* * * * *